US009377100B2

(12) United States Patent
Fredriksson

(10) Patent No.: US 9,377,100 B2
(45) Date of Patent: Jun. 28, 2016

(54) SHIFTER ASSEMBLY

(71) Applicant: Kongsberg Automotive AB, Mullsjo (SE)

(72) Inventor: Robert Fredriksson, Mullsjo (SE)

(73) Assignee: KONGSBERG AUTOMOTIVE AB, Mullsjo (SE)

( * ) Notice: Subject to any disclaimer, the term of this patent is extended or adjusted under 35 U.S.C. 154(b) by 0 days.

(21) Appl. No.: 13/930,793

(22) Filed: Jun. 28, 2013

(65) Prior Publication Data

US 2014/0007729 A1 Jan. 9, 2014

Related U.S. Application Data

(60) Provisional application No. 61/690,843, filed on Jul. 6, 2012.

(51) Int. Cl.
*F16H 59/02* (2006.01)
*F16H 61/22* (2006.01)

(52) U.S. Cl.
CPC ............ *F16H 59/0278* (2013.01); *F16H 59/02* (2013.01); *F16H 59/0204* (2013.01); *F16H 61/22* (2013.01); *F16H 2059/026* (2013.01);
(Continued)

(58) Field of Classification Search
CPC ............ F16H 2059/0282; F16H 59/02; F16H 59/0278; F16H 2059/0286; F16H 59/0204; F16H 61/22; G05G 5/02
USPC ............... 74/473.18, 473.21, 473.22, 473.24, 74/473.25, 473.26, 473.3, 473.1
See application file for complete search history.

(56) References Cited

U.S. PATENT DOCUMENTS 3,979,967 A * 9/1976 Dunlap .................... 74/473.3
4,275,613 A * 6/1981 Worner et al. ............ 74/473.26
4,275,614 A 6/1981 Okubo et al.
(Continued)

FOREIGN PATENT DOCUMENTS

DE 102005034090 A1 2/2007
DE 102009028934 A1 3/2011
(Continued)

OTHER PUBLICATIONS

English language computer-generated translation for JP 5-52428 extracted from PAJ database on Jul. 24, 2013, 19 pages.
(Continued)

*Primary Examiner* — William Kelleher
*Assistant Examiner* — Gregory Prather
(74) *Attorney, Agent, or Firm* — Howard & Howard Attorneys PLLC

(57) ABSTRACT

A shifter assembly for selecting one of a plurality of gears of a transmission of a vehicle includes a housing having an index track for defining a first mode and a second mode. A shift lever is movably coupled to the housing and interfaces with the index track as the shift lever moves between the modes. A blocker coupled to the housing has a first engagement surface engageable by the shift lever when in the first mode to prevent the shift lever from entering the second mode with the blocker moving in a first direction when the shift lever abuts the first engagement surface. The blocker has a second engagement surface engaged by the shift lever when moving from the first mode to the second mode with the blocker moving in a second direction substantially transverse to the first direction when the shift lever abuts the second engagement surface.

33 Claims, 12 Drawing Sheets

(52) U.S. Cl.
CPC ... *F16H 2059/0282* (2013.01); *Y10T 74/20085* (2015.01)

(56) References Cited

U.S. PATENT DOCUMENTS

| | | | | |
|---|---|---|---|---|
| 4,513,276 | A * | 4/1985 | Kubota et al. | 200/61.88 |
| 4,671,085 | A * | 6/1987 | Yamaguchi et al. | 70/248 |
| 4,898,045 | A * | 2/1990 | Baba | 74/471 R |
| 4,905,802 | A * | 3/1990 | Gotoh | 70/245 |
| 4,936,158 | A * | 6/1990 | Livshits et al. | 74/473.23 |
| 4,942,937 | A | 7/1990 | Amberger et al. | |
| 4,991,700 | A * | 2/1991 | Koga | 192/220.3 |
| 5,029,680 | A * | 7/1991 | Kobayashi et al. | 192/220.5 |
| 5,293,763 | A * | 3/1994 | Asano et al. | 70/248 |
| 5,481,077 | A | 1/1996 | Clegg et al. | |
| 5,540,180 | A | 7/1996 | Kataumi et al. | |
| 5,566,582 | A * | 10/1996 | Beadle et al. | 74/473.19 |
| 5,575,175 | A * | 11/1996 | Kataumi et al. | 74/473.28 |
| 5,577,418 | A * | 11/1996 | Traxler et al. | 74/528 |
| 5,662,000 | A * | 9/1997 | Patterson et al. | 74/473.26 |
| 5,727,423 | A | 3/1998 | Torii et al. | |
| 5,946,976 | A | 9/1999 | Miyoshi et al. | |
| 6,038,937 | A | 3/2000 | Van Order et al. | |
| 6,189,398 | B1 * | 2/2001 | Kataumi et al. | 74/423 |
| 6,196,080 | B1 | 3/2001 | Lee | |
| 6,230,579 | B1 | 5/2001 | Reasoner et al. | |
| 6,237,435 | B1 * | 5/2001 | Gronhage et al. | 74/471 XY |
| 6,339,968 | B1 * | 1/2002 | Nagashima | 74/473.25 |
| 6,374,978 | B1 * | 4/2002 | Spencer | 192/220.3 |
| 6,401,564 | B1 | 6/2002 | Lee | |
| 6,422,106 | B1 | 7/2002 | Lee | |
| 6,487,883 | B2 * | 12/2002 | Suzuki et al. | 70/247 |
| 6,789,444 | B2 * | 9/2004 | Fujiwara et al. | 74/473.23 |
| 6,945,132 | B2 | 9/2005 | Kim | |
| 7,114,410 | B2 | 10/2006 | Nagasawa | |
| 7,174,802 | B2 | 2/2007 | Wakayama | |
| 7,213,483 | B2 * | 5/2007 | Inoguchi | F16H 59/10 74/473.21 |
| 7,444,899 | B2 | 11/2008 | Oda et al. | |
| 7,779,715 | B2 | 8/2010 | Mitteer | |
| 8,196,491 | B2 | 6/2012 | Wilson et al. | |
| 2002/0026847 | A1 | 3/2002 | Lee | |
| 2002/0040615 | A1 | 4/2002 | Tomida | |
| 2003/0131679 | A1 * | 7/2003 | Balamucki et al. | 74/473.29 |
| 2004/0168537 | A1 | 9/2004 | Koontz | |
| 2005/0081671 | A1 * | 4/2005 | Oda et al. | 74/473.18 |
| 2005/0223834 | A1 * | 10/2005 | Otsuka | F16H 59/0204 74/473.18 |
| 2006/0060019 | A1 * | 3/2006 | Sato et al. | 74/473.23 |
| 2007/0068325 | A1 * | 3/2007 | Rudelic et al. | 74/523 |
| 2007/0234837 | A1 | 10/2007 | Russell | |
| 2008/0006115 | A1 * | 1/2008 | Mitteer | 74/473.21 |
| 2008/0178645 | A1 * | 7/2008 | Howe et al. | 70/201 |
| 2008/0271560 | A1 | 11/2008 | Giefer et al. | |
| 2009/0272216 | A1 * | 11/2009 | Wilson et al. | 74/473.19 |
| 2010/0013621 | A1 | 1/2010 | Kazyaka | |
| 2011/0036193 | A1 * | 2/2011 | Ueta et al. | 74/473.21 |
| 2012/0103122 | A1 | 5/2012 | Morrissett | |
| 2014/0165764 | A1 | 6/2014 | Moon et al. | |
| 2015/0090061 | A1 * | 4/2015 | Skogward et al. | 74/473.15 |

FOREIGN PATENT DOCUMENTS

| | | |
|---|---|---|
| EP | 0964187 B1 | 12/1999 |
| EP | 1076192 B1 | 2/2001 |
| EP | 1207321 A2 | 5/2002 |
| GB | 233250 B | 6/2002 |
| JP | 53-104527 U | 8/1978 |
| JP | 58-10120 U | 1/1983 |
| JP | 5-52428 U | 7/1993 |
| JP | 5-77658 U | 10/1993 |
| JP | 10-100719 A | 4/1998 |
| JP | 10-151957 A | 6/1998 |
| JP | 11-03684 A | 2/1999 |
| JP | 11-034683 A | 2/1999 |
| JP | 3725664 B2 | 12/2005 |
| JP | 2008080908 A | 4/2008 |
| WO | WO 2005/039914 A2 | 5/2005 |

OTHER PUBLICATIONS

English language computer-generated translation for JP 5-77658 extracted from PAJ database on Jul. 24, 2013, 23 pages.

English language abstract and computer-generated translation for JP 10-100719 extracted from PAJ database on Jul. 24, 2013, 40 pages.

English language abstract and computer-generated translation for JP 10-151957 extracted from PAJ database on Jul. 24, 2013, 51 pages.

English language abstract and computer-generated translation for JP 11-034683 extracted from PAJ database on Jul. 24, 2013, 43 pages.

English language abstract and computer-generated translation for JP 11-03684 extracted from PAJ database on Jul. 24, 2013, 42 pages.

English language abstract for JP 3725664 extracted from espacenet.com and PAJ databases on Jul. 24, 2013, 59 pages.

English language computer-generated translation for JP 2008080908 extracted from PAJ database on Jul. 24, 2013, 30 pages.

English language abstract and computer-generated translation for EP 0964187 extracted from espacenet.com database on Dec. 20, 2013, 8 pages.

English language abstract and computer-generated translation for EP 1076192 extracted from espacenet.com database on Dec. 20, 2013, 6 pages.

English language abstract and computer-generated translation for DE 102005034090 extracted from espacenet.com database on Dec. 20, 2013, 8 pages.

English language abstract and computer-generated translation for DE 102009028934 extracted from espacenet.com database on Dec. 20, 2013, 13 pages.

* cited by examiner

US 9,377,100 B2

SHIFTER ASSEMBLY

CROSS-REFERENCE TO RELATED APPLICATION

The subject patent application claims priority to and all the benefits of U.S. Provisional patent application No. 61/690,843 filed on Jul. 6, 2012, which is herein incorporated by reference in its entirety.

BACKGROUND OF THE INVENTION

1. Field of the Invention

The invention generally relates to shifter assemblies for vehicle transmissions. More specifically, the invention relates to a device to restrict certain movement of a shifter assembly between a first mode and a second mode.

2. Description of Related Art

It is commonly known to use a shifter assembly in a vehicle to select between a plurality of gears of a transmission of the vehicle. Some currently available vehicles are equipped with shifter assemblies that allow selection of different modes of operation of the transmission. For example, a first mode may be an automatic mode of the transmission and a second mode may be a manual mode of the transmission.

Some shifter assemblies are designed with a P-R-N-D-M (Park-Reverse-Neutral-Drive-Manual) shift pattern. When a user attempts to shift the shift lever from the Park, the Reverse, or the Neutral position to the Drive position, the user can unintentionally shift the shift lever beyond the Drive position to the Manual position.

Blocking mechanisms are used to prevent the shift lever from inadvertently entering into the second, or in the example above Manual, mode. The prior art blocking mechanism can, at times, be complicated to operate, occupy excessive space and/or be unable to handle repeated engagement from the shift lever.

As such, there remains an opportunity to design a shifter assembly having a blocking mechanism that is relatively simple, compact and can handle repeated engagement from the shift lever.

SUMMARY OF THE INVENTION AND ADVANTAGES

A shifter assembly for selecting one of a plurality of gears of a transmission of a vehicle has a housing having an index track for defining a first mode and a second mode. A shift lever is movably coupled to the housing and interfaces with the index track as the shift lever moves between the modes. A blocker coupled to the housing has a first engagement surface engageable by the shift lever when in the first mode to prevent the shift lever from entering the second mode with the blocker moving in a first direction when the shift lever abuts the first engagement surface. The blocker has a second engagement surface engaged by the shift lever when moving from the first mode to the second mode with the blocker moving in a second direction transverse to the first direction when the shift lever abuts the second engagement surface.

Advantageously, the shift lever abuts the first engagement surface of the blocker to prevent unintended shifting into the second mode. The blocker is also movable in a second direction when the shift lever engages with the second engagement surface. The blocker therefore provides the necessary functionality while being relatively simple, compact and robust.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE INVENTION

Referring to the Figures wherein like numerals indicate like parts throughout the several views, a shifter assembly 20 for selecting one of a plurality of gears of a transmission of a vehicle is shown. The shifter assembly 20 can be any assembly that can be used for selecting the plurality of gears of the transmission of the vehicle. The shifter assembly 20 can be coupled to the vehicle in any suitable manner for allowing a user to interact with the shifter assembly 20. The plurality of gears can be any number of gears, such as, for example, Park (P), Reverse (R), Neutral (N), Drive (D), and Manual (M). Although not shown specifically in the Figures, the plurality of gears can include a low gear, overdrive gear, or any other gear for facilitating movement of the vehicle. The transmission, although typically an automatic transmission, may be any suitable transmission type. The vehicle can be an automobile or any other type of vehicle that may utilize the shifter assembly 20.

Figure 1:
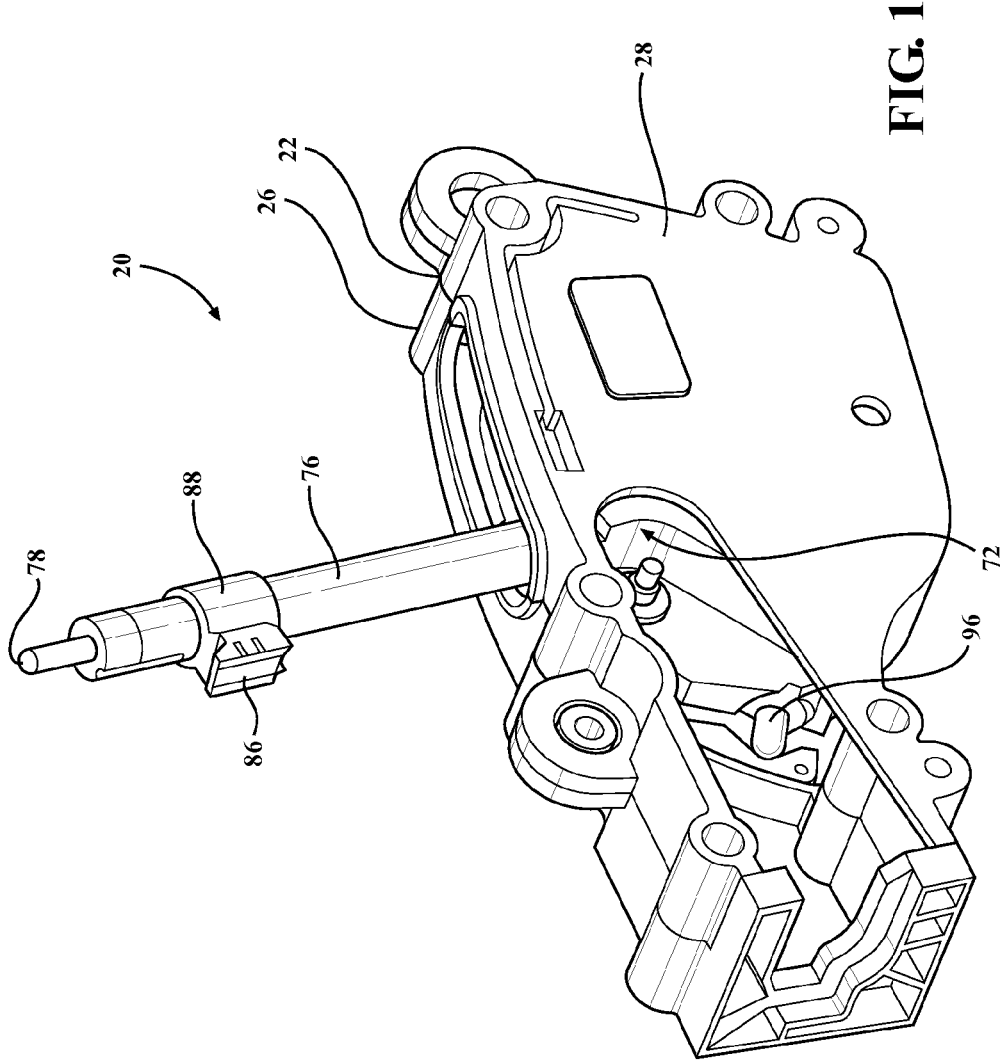
FIG. 1 is a perspective view of a shifter assembly.
Figure 2:
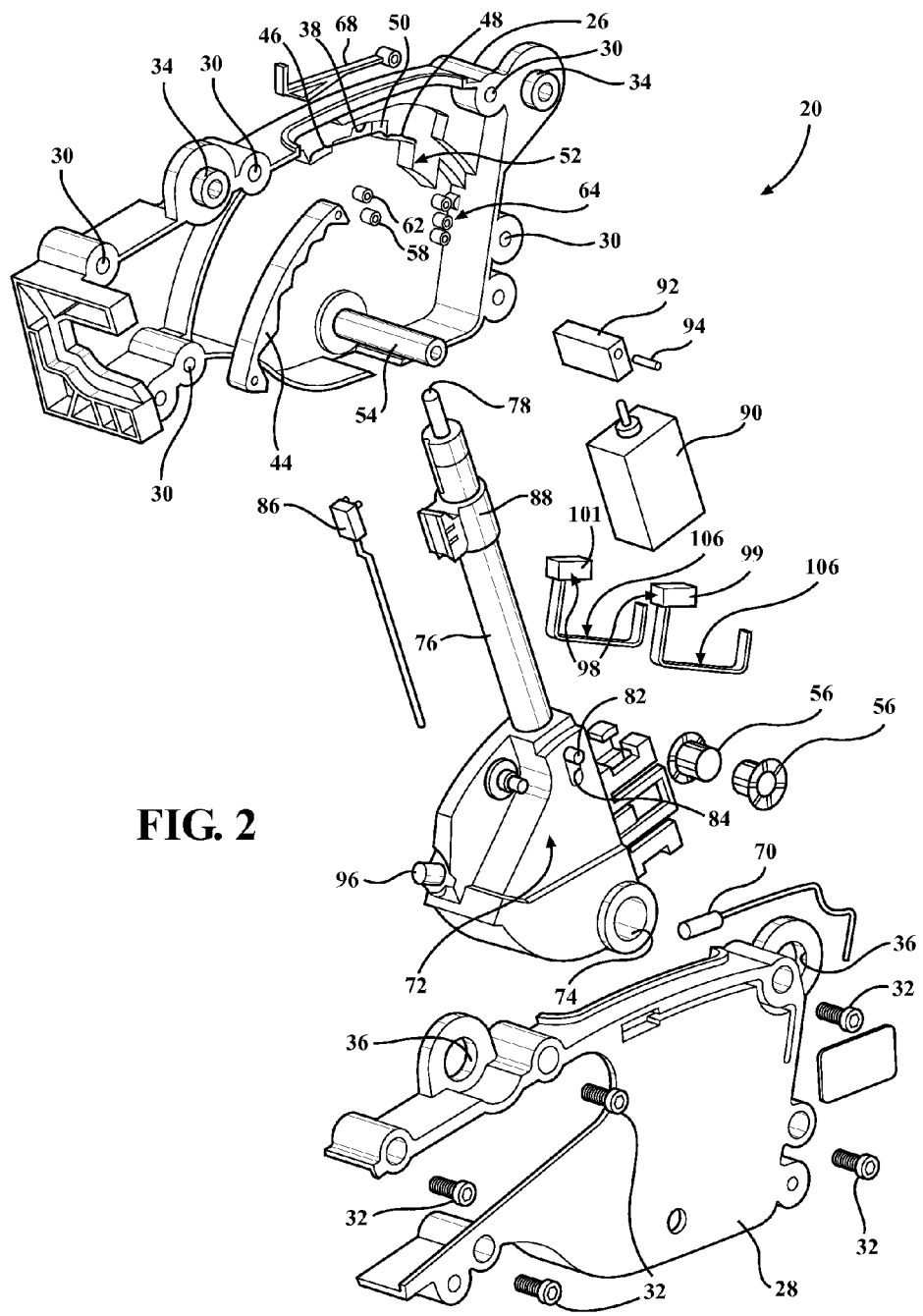
FIG. 2 is an exploded view of the shifter assembly.

With reference to FIGS. 1 and 2, the shifter assembly 20 includes a housing 22 defining an interior 24. The housing 22 can be coupled to the vehicle in any suitable manner in order to allow the user to interact with the shifter assembly 20. For example, as best shown in FIG. 2, the housing 22 includes a first half 26 and a second half 28. The first half 26 and the second half 28 are coupled together defining the interior 24.

The shifter assembly 20 includes a shift lever 72 pivotally coupled to the housing 22. The shift lever 72 is moveable to various positions, for example, Park (P), Reverse (R), Neutral (N), and Drive (D) positions corresponding to the P, R, N, and D gears, respectively.

The shifter assembly includes a blocker 98 disposed in the interior 24 of the housing 22 for limiting the movement of the shift lever 72, as set forth below. The shifter assembly 20 includes a retaining member 106 coupled to the housing 22 in the interior 24, as set forth further below. The blocker 98 is coupled to the retaining member 106.

The housing 22 of the shifter assembly 20 defines an index track 38 disposed in the interior 24 of the housing 22. The index track 38 may be defined by the first half 26 and/or the second half 28. For example, as shown in FIGS. 2-12, the first half 26 and/or the second half 28 each define index tracks 38.

The index track 38 defines a first mode 46 and a second mode 48 corresponding to first and second modes of operation of the transmission. For example, the first mode 46 of the shifter assembly 20 corresponds to an automatic mode of operation of the transmission and the second mode corresponds to a manual mode of operation of the transmission. The first mode 46 may include the P, R, N, and D positions. It is to be appreciated that the first mode 46 may include additional configurations not specifically shown in the Figures. The second mode 48 is typically disposed along the index track 38 after the Drive (D) position, which will be further described below. Alternatively, the second mode 48 may be disposed at any point along the index track 38.

The index track 38 presents an engagement wall 50 facing the first mode 46 of the index track 38. Specifically, the engagement wall 50 is disposed at the D position of the index track 38. The engagement wall 50 may act as a barrier between the first mode 46 and the second mode 48. It is to be appreciated that the engagement wall 50 may be any suitable wall or any number of walls presented at any portion of the index track 38.

The index track 38 presents a protrusion 52 disposed at the second mode 48 of the index track 38. The protrusion 52 is disposed adjacent to the engagement wall 50 and extends into the interior 24 of the housing 22. The protrusion 52 prevents the shift lever 72 from moving into the second mode 48 when the shift lever 72 is engaged with the blocker 98 and moving from the first mode 46 toward the second mode 48.

The shifter assembly 20, as shown throughout FIGS. 2-12, has a pin 58 (hereinafter referred to as a "first pin 58") fixed to the housing 22 and protruding into the interior 24 of the housing 22. The shifter assembly 20 includes a second pin 62 fixed to the housing 22 and spaced from the first pin 58. The second pin 62 is fixed to the housing 22 and disposed between the first pin 58 and the blocker 98.

As shown throughout FIGS. 2-12, the first pin 58 and the second pin 62 are fixed to the first half 26 of the housing 22. The first pin 58 may, as is also shown throughout FIGS. 2-12, be a pair of first pins 58 with one of the pair of first pins 58 fixed to the first half 26 of the housing 22 and the other of the pair of first pins 58 fixed to the second half 28 of the housing 22. The second pin 62 may, as is also shown throughout FIGS. 2-12, be a pair of second pins 62 with one of the pair of second pins 62 fixed to the first half 26 of the housing 22 and the other of the pair of second pins 62 fixed to the second half 28 of the housing 22. It is to be appreciated that, while the Figures disclose the pair of first pins 58 and the pair of second pins 58, the shifter assembly 20 may include any number of first pins 58 and second pins 62 without departing from the nature of the present invention.

The shifter assembly 20 includes an engagement feature 64 disposed adjacent to the first pin 58 in the interior 24 of the housing 22. A portion of the retaining member 106 is coupled to the engagement feature 64. The shifter assembly 20 may include, as is shown in the Figures, a pair of engagement features 64 with one of the pair of engagement features 64 fixed to the first half 26 and the other of the pair of engagement features 64 fixed to the second half 28. It is to be appreciated that any number of engagement features 64 may be utilized.

With reference to FIG. 2, the shift lever 72 is movably coupled to the housing 22 with the shift lever 72 being partially disposed in the interior 24 of the housing 22. The shift lever 72 interfaces with the index track 38 as the shift lever 72 moves between the first mode 46 and the second mode 48.

As shown in the Figures, the shift lever 72 is movable between the first 46 and second modes 48 along a substantially linear path. It is to be appreciated that the substantially linear path can be a perfectly linear path or variations of a linear path without departing from the broadest scope of the present invention. The shift lever 72 may interface with the index track 38 during the entire movement of the shift lever 72 from the first mode 46 to the second mode 48, or the shift lever 72 may only partially interface with the index track 38 as the shift lever 72 moves from the first mode 46 to the second mode 48. In other words, the shift lever 72 is free to disengage from the index track 38 when moving from the first mode 46 toward the second mode 48.

The shift lever 72 includes a shaft 76 partially disposed within the interior 24 of the housing 22 and extending outwardly toward a passenger compartment (not shown) of the vehicle. The shaft 76 has a push rod 78 extending within the shaft 76 and partially extending outwardly toward the passenger compartment of the vehicle. The shaft 76 may have a knob or any other suitable device (not shown) coupled to the push rod 78 and the shaft 76 in which the user may interact with the shift lever 72 and move the shift lever 72 between the first mode 46 and the second mode 48.

The shift lever 72 is engageable with the blocker 98 when the shift lever 72 moves toward the second mode 48. For example, the shift lever includes an extension 82 that is engageable with the blocker 98 when the shift lever 72 moves toward the second mode 48. The extension 82 extends outwardly in opposite directions relative to the shaft 76. Specifically, the extension 82 extends outwardly through a slot 84 defined by the shaft 76 and transverse from the shaft 76 toward the first half 26 and the second half 28 of the housing 22. The extension 82 is movable within the slot 84. The extension 82 is engageable to the index track 38 when the shift lever 72 moves between the first mode 46 and the second mode 48. Alternatively, the shift lever 72 can have any suitable configuration for engaging the blocker 98.

Figure 3:
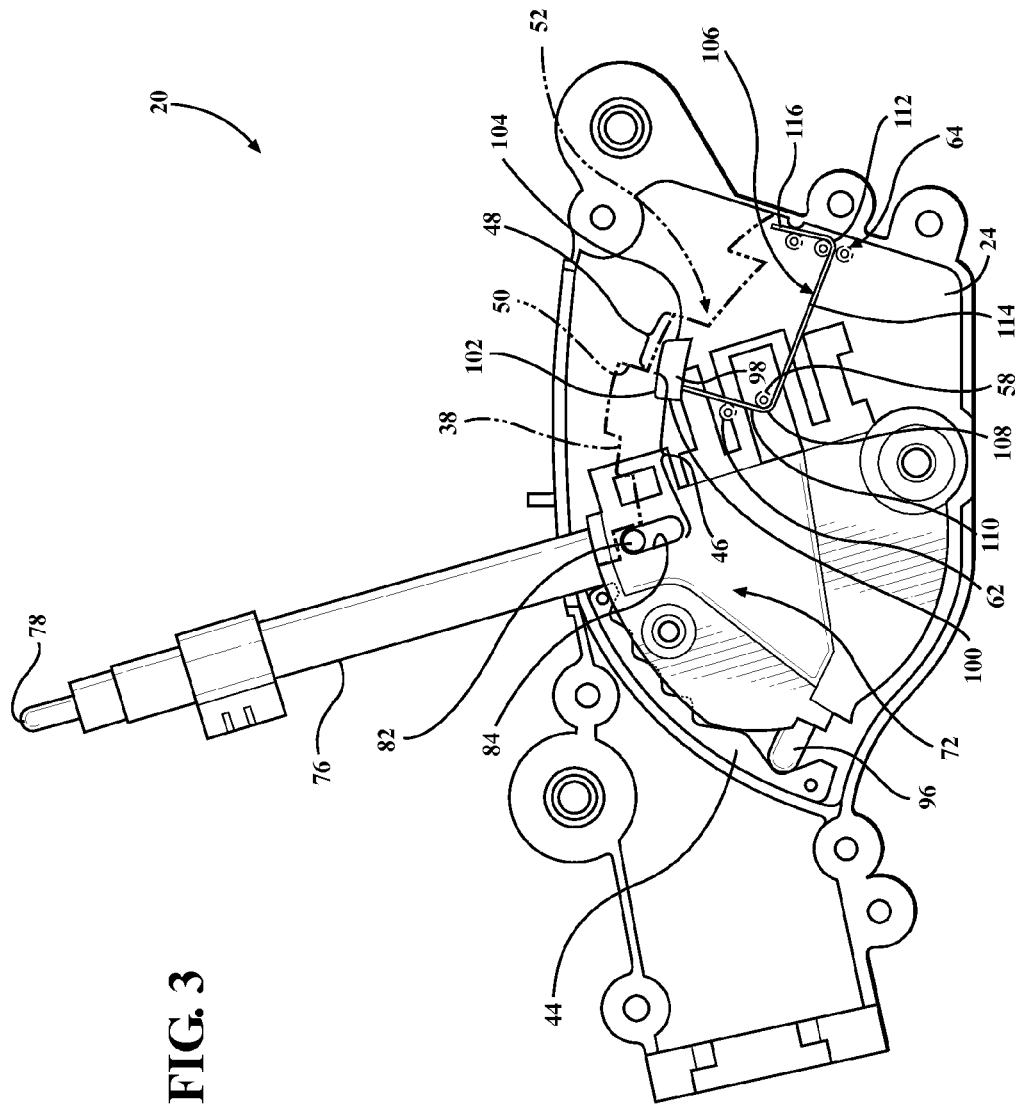
FIG. 3 is a side view of a portion of the shifter assembly in which a shift lever is in a park position.
Figure 4:
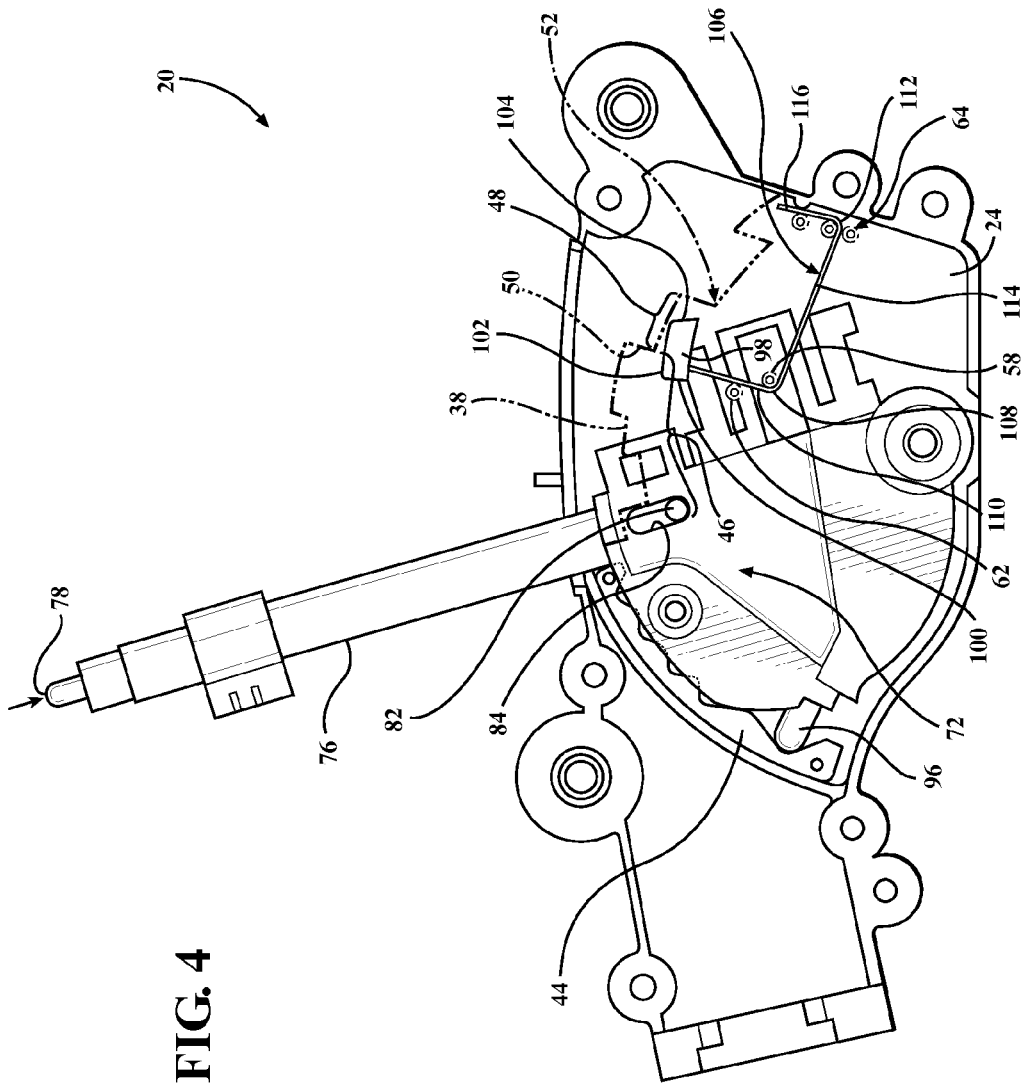
FIG. 4 is a side view of the portion of the shifter assembly in the park position with a push rod is fully depressed.
Figure 8:
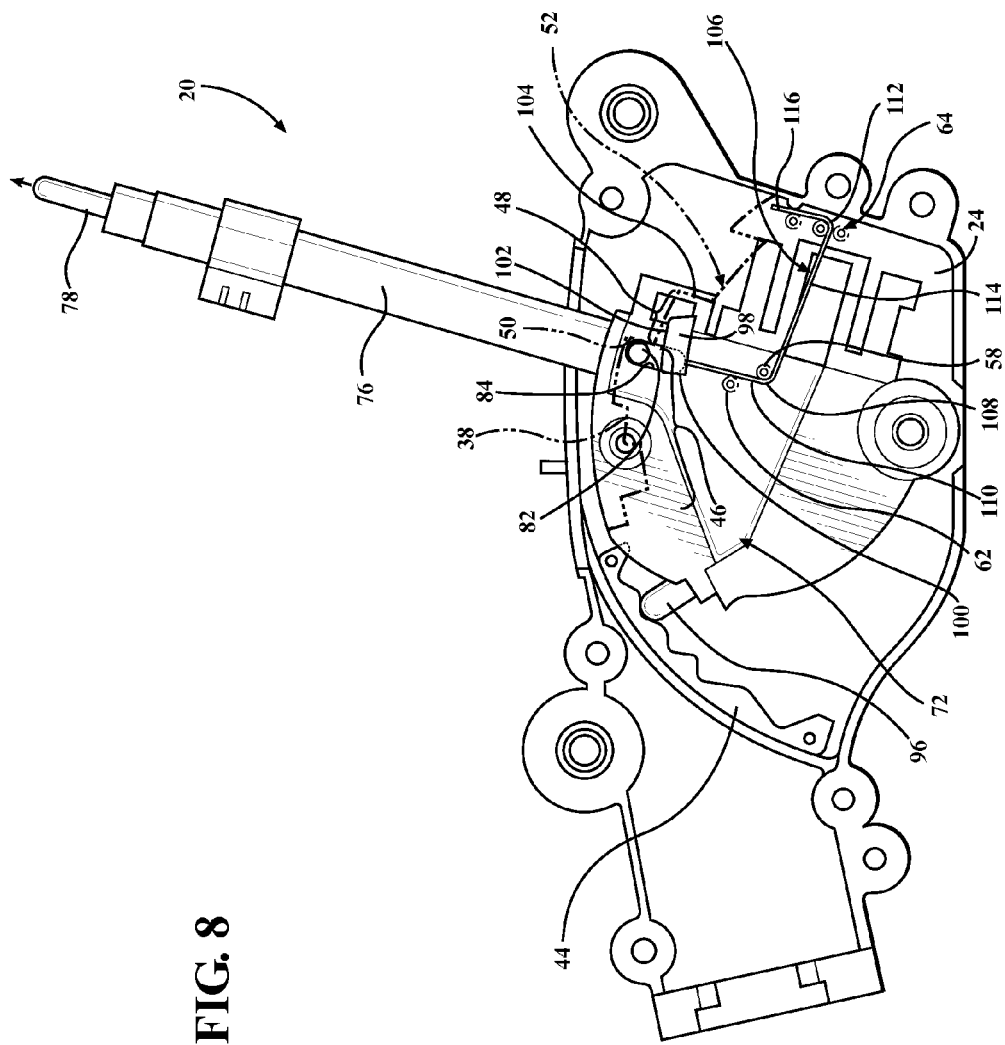
FIG. 8 is a side view of the portion of the shifter assembly with the shift lever in the drive position, the push rod released and the blocker in a rest position.
Figure 9:
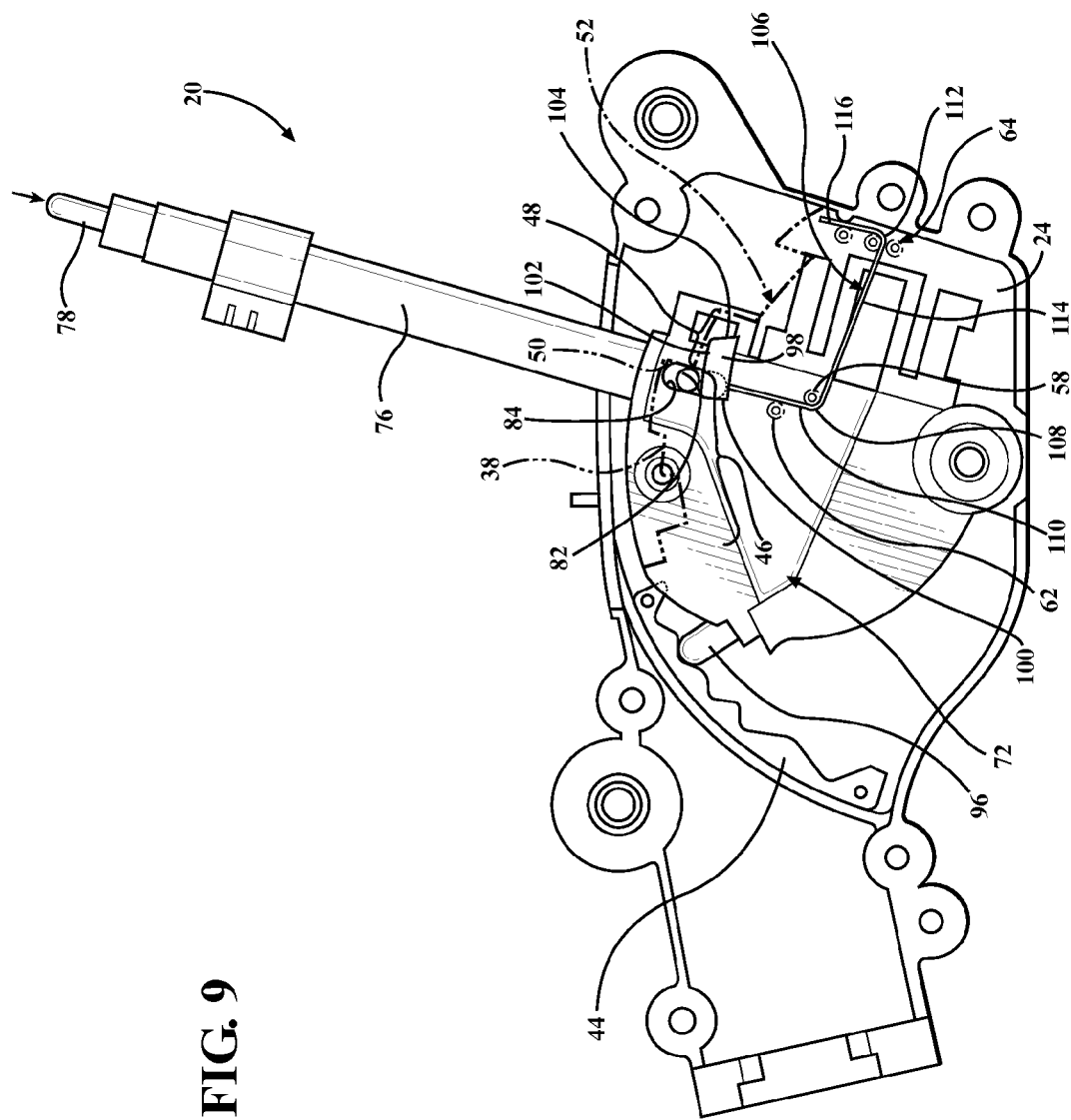
FIG. 9 is a side view of the portion of the shifter assembly with the shift lever in the drive position, the push rod partially depressed and the blocker in the rest position.
Figure 10:
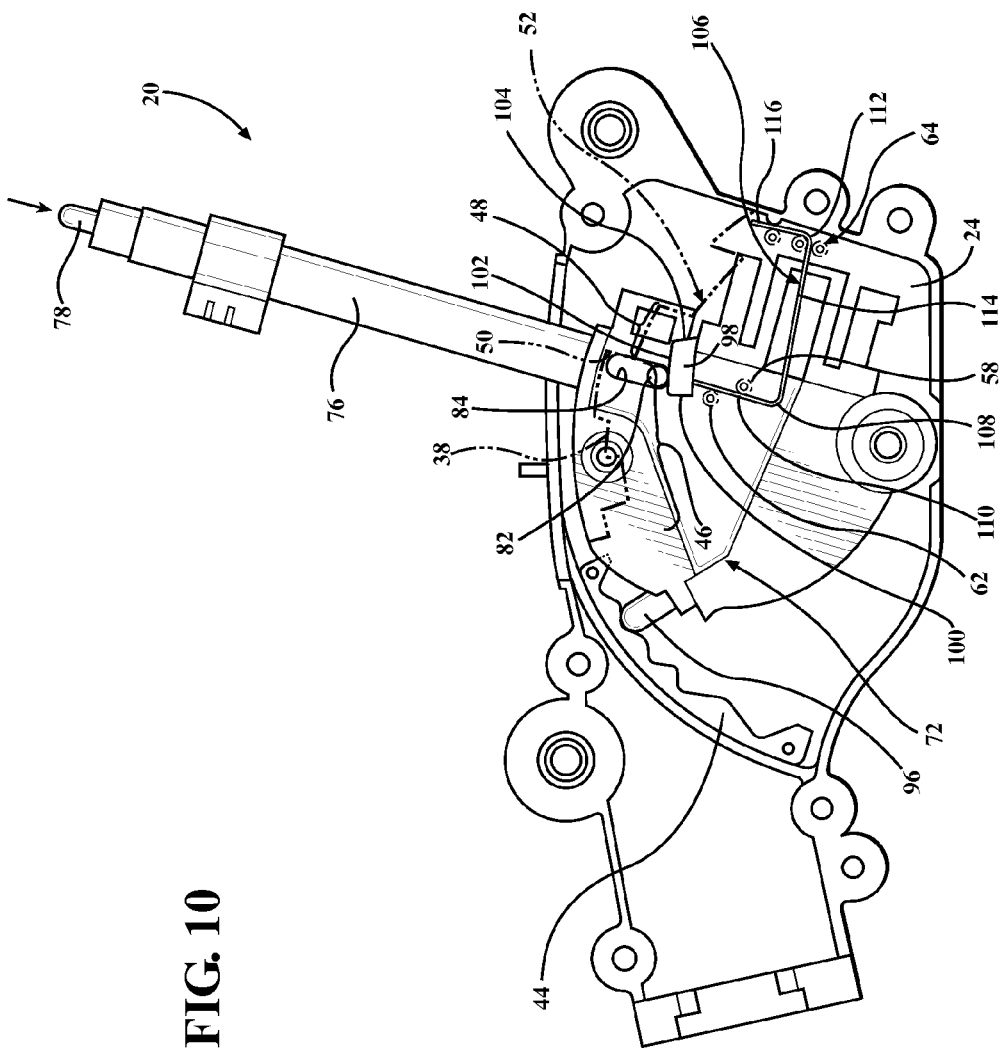
FIG. 10 is a side view of the portion of the shifter assembly with the shift lever in the drive position and the push rod is fully depressed such that the extension is in contact with the second engagement surface of the blocker and moves the blocker downward.
Figure 11:
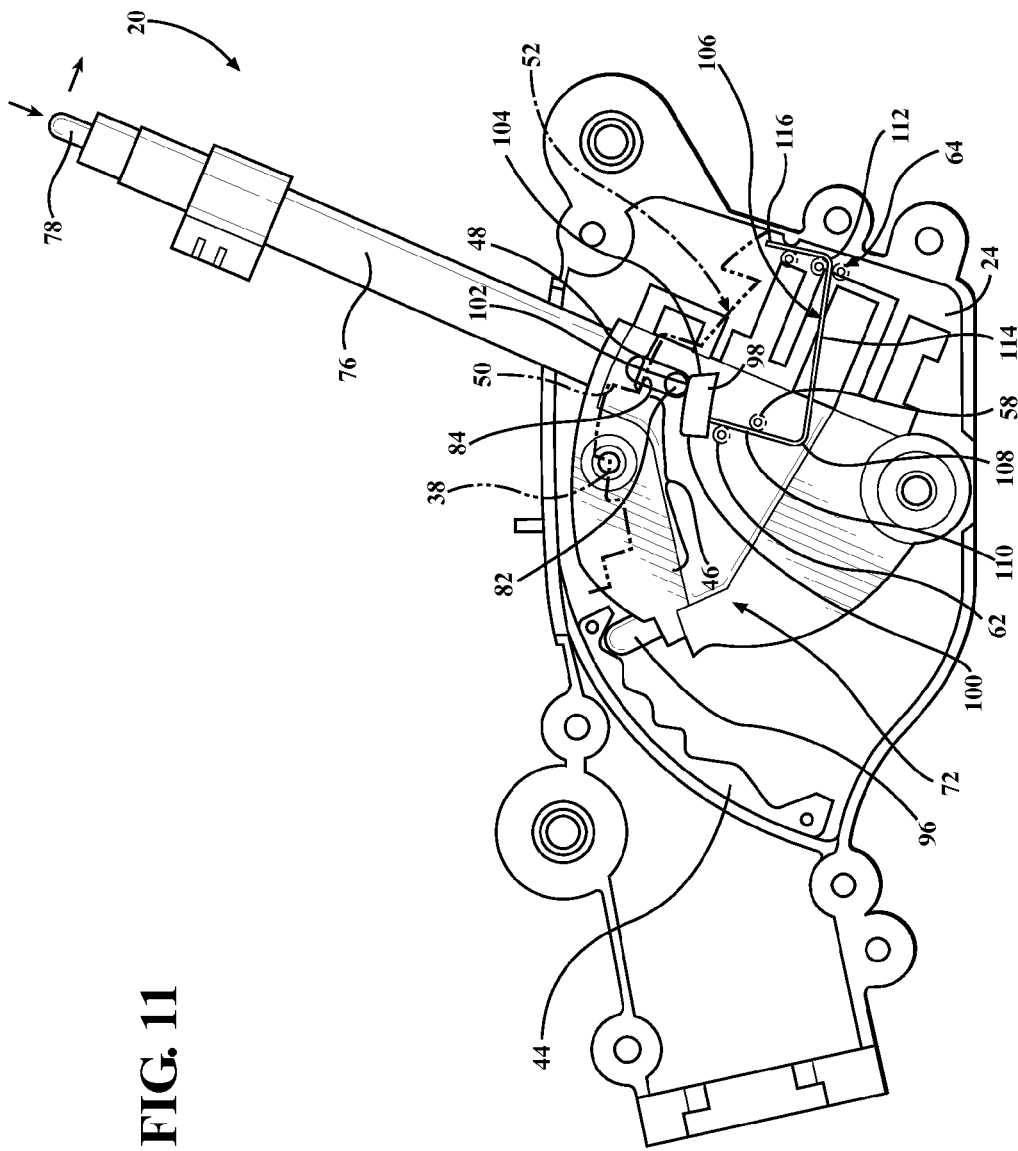
FIG. 11 is a side view of the portion of the shifter assembly in which the shift lever is in a manual position with the push rod fully depressed and the extension remaining in contact with the second engagement surface of the blocker.
Figure 12:
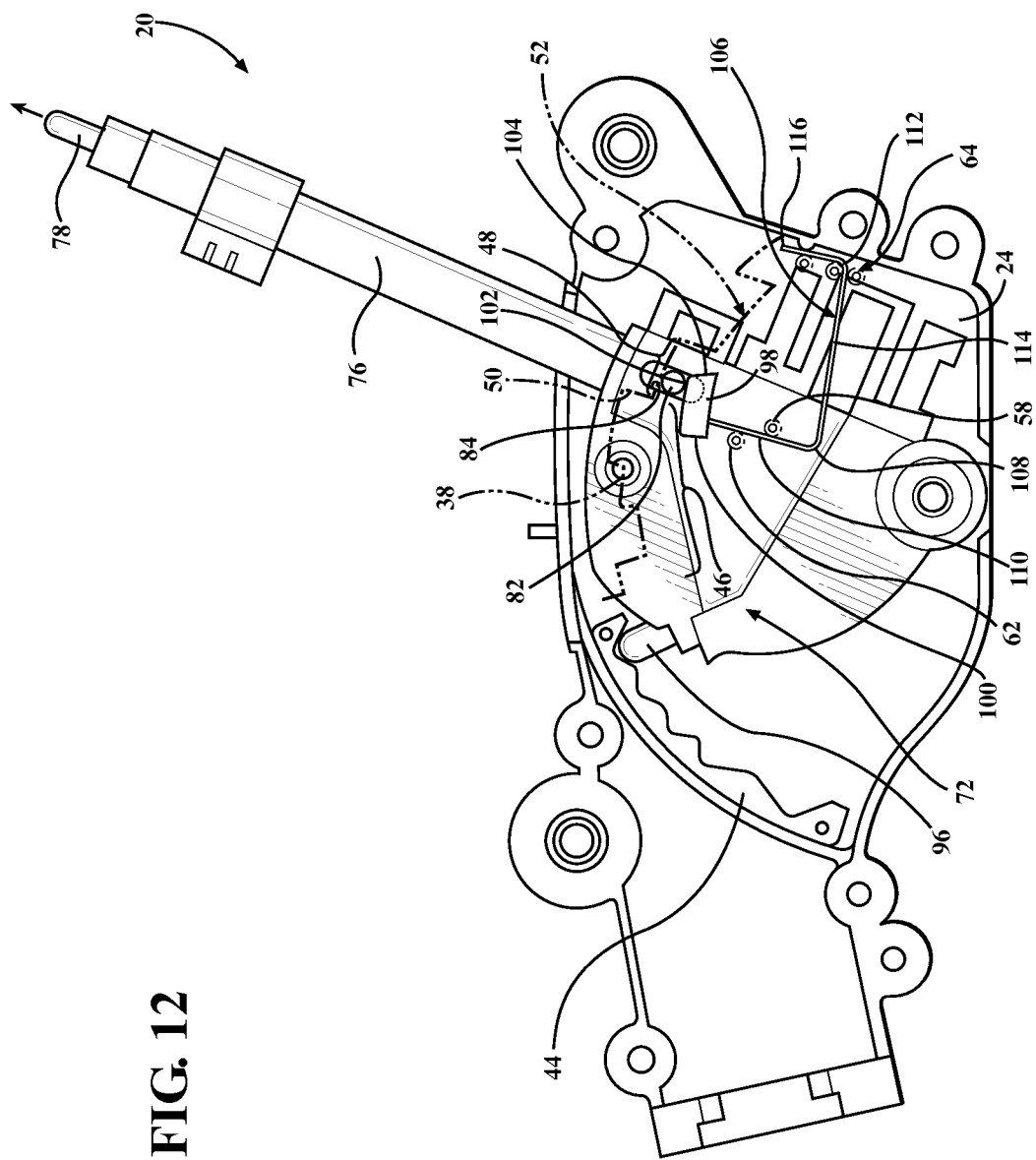
FIG. 12 is a side view of the portion of the shifter assembly with the shift lever in the manual position, the push rod released and the blocker is biased upward such that the extension is in contact with the second engagement surface of the blocker.

As the push rod 78 is depressed relative to the shaft 76, the extension 82 moves within the slot 84 along the shaft 76. When the push rod 78 is fully depressed, the extension 82 moves to a fully depressed position, as shown in FIG. 4. The fully depressed position of the extension 82 may be any position that allows the shift lever 72 to move relative to the housing 22. When the push rod 78 is released, as shown in FIGS. 3, 8 and 12, the extension 82 is in a released position such that the extension 82 abuts the index track 38.

As best shown in FIG. 2, the blocker 98 is coupled to the housing 22 and is disposed in the interior 24 of the housing 22 with the blocker 98 having a first engagement surface 100 and a second engagement surface 102. The blocker 98 presents a third engagement surface 104 spaced from the first engagement surface 100 facing the protrusion 52. The blocker 98 may be more than one part or any number of blockers 98, which, in turn, may define multiple engagement surfaces. For example, as shown in FIG. 2, the blocker 98 is further defined as a first blocker 101 coupled to the first half 26 and a second blocker 99 spaced from the first blocker 101 coupled to the second half 28. The first blocker 101 is typically identical to the second blocker 99, as shown in the Figures. The first blocker 101 engages the index track 38 of the first half 26 and the second blocker 99 engages the index track 38 of the second half 28.

It is to be appreciated that the blocker 98 can include any type of structure such as a head without departing from the nature of the present invention. For example, the head can present the first 100, second 102 and third 14 engagement surfaces. The head may be coupled to the retaining member 106.

The blocker 98 is movable in a first direction and a second direction. Specifically, the blocker 98 can move along a substantially arcuate path relative to the housing 22 when moving in the first direction. The substantially arcuate path can be any non-linear path such that the extension 82 remains in contact with the blocker 98 as the blocker 98 pivots about the first pin 58. The blocker 98 can move along a transverse path relative to the first direction when moving in the second direction. The transverse path can be a linear path such that the extension 82 remains engaged with the blocker 98 as the extension 82 moves within the slot 84. The transverse path can be a semi-linear path such that the extension 82 remains engaged with the blocker 98 as the extension 82 moves within the slot 84. The transverse path is a path such that the transverse path intersects the first direction at any angle.

As set forth above and as shown in FIGS. 3-12, the retaining member 106 is engaged with the housing 22 and the blocker 98 is coupled to the retaining member 106. It is to be appreciated that, as shown in FIG. 2, the shifter assembly 20 may have more than one retaining member 106, with one of the retaining members 106 being coupled to the first blocker 101 and the other retaining member 106 being coupled to the second blocker 99.

Portions of the retaining member 106 are configured to resiliently bend relative to the housing 22. The retaining member 106 is rotatably coupled to the housing 22. Specifically, the retaining member 106 is rotatable about the first pin 58. The retaining member 106 is resiliently bendable about the first pin 58.

The retaining member 106 is slideably coupled to the housing 22. Specifically, the retaining member is slideable between the first pin 58 and the second pin 62 relative to the housing 22.

With reference to FIGS. 3-12, the retaining member 106 includes an elbow 108 (hereinafter first elbow 108) extending about the first pin 58 and an arm 110 (hereinafter first arm 110) extending from the first elbow 108 to the blocker 98. Said differently, the first elbow 108 wraps around and abuts the first pin 58 with the first arm 110 extending from and connecting the first elbow 108 to the blocker 98. The first elbow 108 is resiliently bendable relative to the first pin 58. The retaining member 106 includes a second elbow 112 spaced from the first elbow 108 and a second arm 114 extending from the first elbow 108 to the second elbow 112. The retaining member 106 includes a third arm 116 extending from the second elbow 112 with the third arm 116 being fixed to the housing 22. The third arm 116 is engaged with the engagement feature 64 to rigidly attach the third arm 116 relative to the housing 22.

As shown in FIGS. 3-12, an operation for shifting the shift lever 72 is shown. In FIG. 3, the shift lever 72 is in the park position prior to the depressing of the push rod 78. In FIG. 4, the shift lever 72 is in the P position with the push rod 78 in the fully depressed position, which, in turn, moves the extension 82 through the slot 84. When the extension 82 is in the fully depressed position, the user may move the shift lever 72 from the P position toward the R, N (FIG. 5), or D position (FIGS. 6-10).

With reference to FIGS. 4-8, when the shift lever 72 moves from the first mode 46 toward the second mode 48, the first engagement surface 100 of the blocker 98 is engageable by the shift lever 72 when in the first mode 46 to prevent the shift lever 72 from entering the second mode 48. The shift lever 72 is moveable relative to the index track 38 toward the second mode 48 of the index track 38 in at least two modes of operation. Specifically, in a first mode of operation of the shift lever 72, the extension 82 is spaced from the index track 38 as the shift lever 72 abuts the first engagement surface 100 of the blocker 98. Alternatively, in a second mode of operation of the shift lever 72, the extension 82 moves along the index track 38 in contact with the index track 38 as the shift lever 72 moves toward the second mode 48 until the shift lever 72 abuts the engagement wall 50, as shown in FIG. 8. In other words, the extension 82 of the shift lever 72 either engages with the first engagement surface 100 of the blocker 98 during the first mode of operation, or the engagement wall 50 during the second mode of operation before the shift lever 72 is able to enter into the second mode 48. Ultimately, the shift lever 72 engages the blocker 98 as the shift lever 72 moves from the first mode 46 toward the second mode 48 along the substantially linear path.

Figure 5:
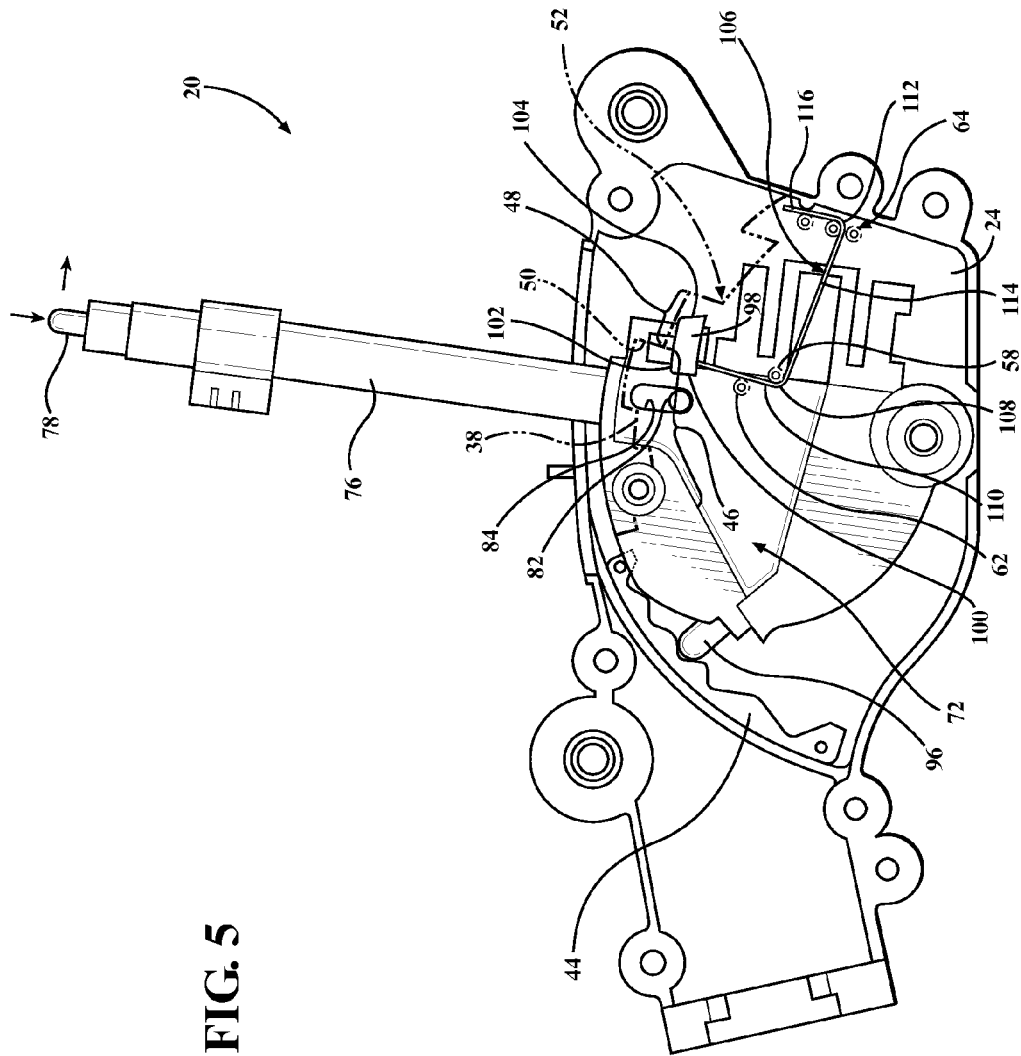
FIG. 5 is a side view of the portion of the shifter assembly in which the shift lever is in a neutral position with the push rod fully depressed.
Figure 6:
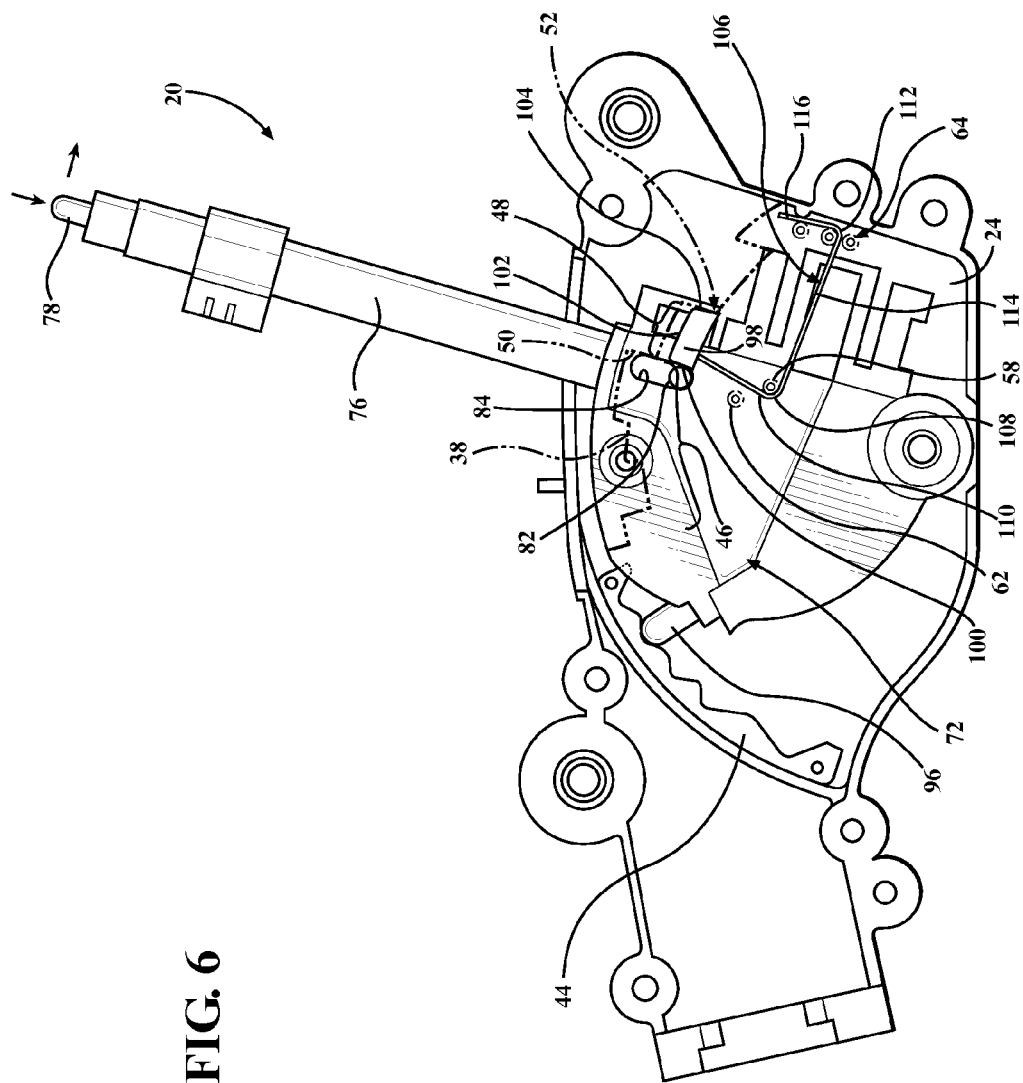
FIG. 6 is a side view of the portion of the shifter assembly in which the shift lever is in a drive position, the push rod is fully depressed and an extension is contacting a first engagement surface of a blocker.
Figure 7:
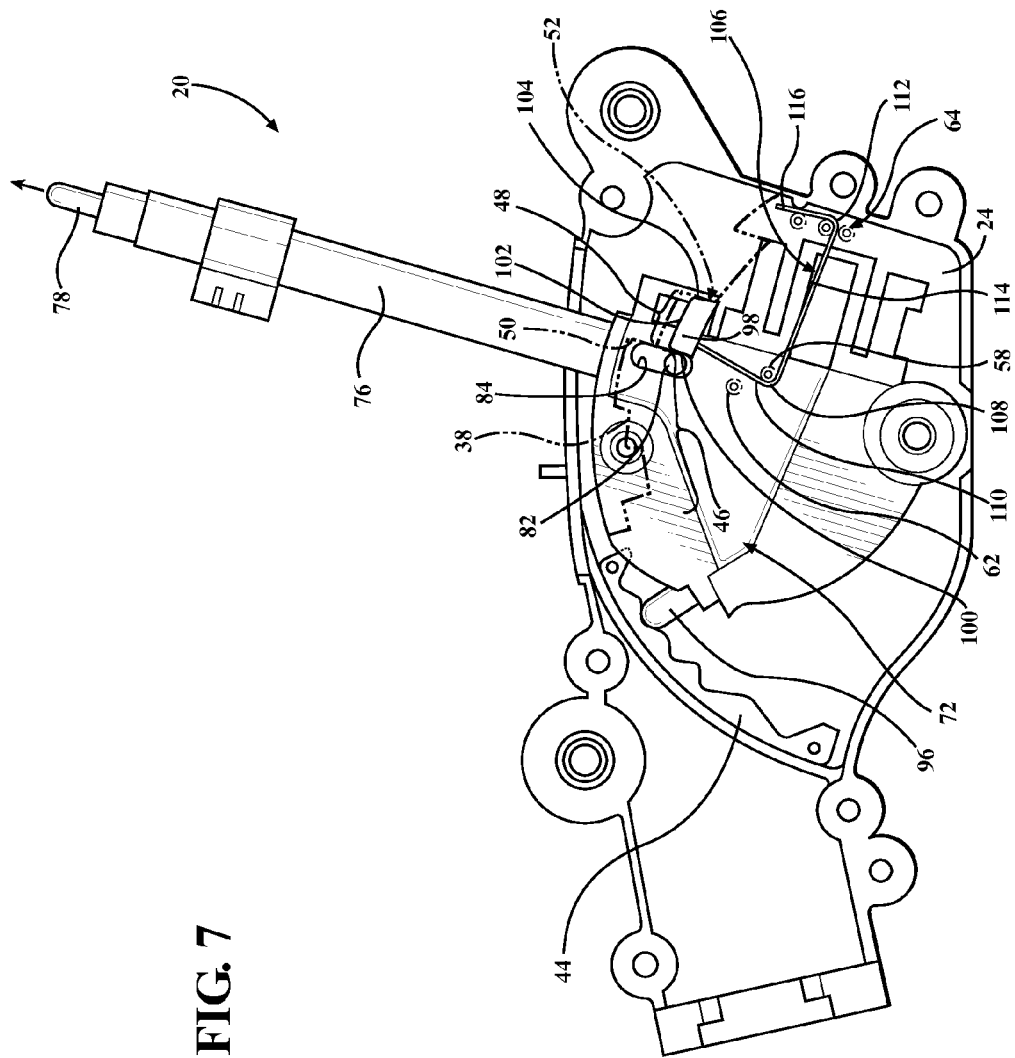
FIG. 7 is a side view of the portion of the shifter assembly in which the shift lever is in the drive position and the push rod is partially depressed.

As shown in FIGS. 5-7, during the first mode of operation, the blocker 98 moves in the first direction when the shift lever 72 abuts the first engagement surface 100 of the blocker 98. Specifically, the extension 82 of the shift lever 72 abuts the blocker 98 and moves the blocker 98 in the first direction. As the shift lever 72 moves toward the second mode 48, the extension 82 simultaneously engages the first 101 and second 99 blockers during selective movement of the shift lever 72. It is to be appreciated that the extension 82 can engage any number of suitable blockers 98 without departing from the nature of the present invention.

As the shift lever 72 abuts the first engagement surface 100 and moves the blocker 98 along the first direction, portions of the retaining member 106 are configured to resiliently bend relative to the housing 22. The retaining member 106 is rotatable about the first pin 58 as the blocker 98 moves in the first direction, as set forth above. As the blocker 98 moves in the first direction, the retaining member 106 resiliently bends about the first pin 58. Specifically, the first elbow 108 resiliently bends relative to the first pin 58 as the blocker 98 moves in the first direction, and the first arm 110 rotates about the first pin 58 as the blocker 98 moves in the first direction. As the shift lever 72 continues to abut the first engagement surface 100 and move the blocker 98 in the first direction, the blocker 98 moves in the first direction until the blocker 98 abuts the protrusion 52. During the movement of the blocker 98 in the first direction, the third arm 116 remains stationary with respect to the housing 22 and the second arm 114 also remains stationary relative to the housing 22.

When the blocker 98 abuts the protrusion 52, as shown in FIGS. 6 and 7, the first engagement surface 100 of the blocker 98 aligns with the engagement wall 50 of the index track 38. Specifically, when the blocker 98 abuts the protrusion 52, the third engagement surface 104 and the protrusion 52 are configured to prevent rotation of the blocker 98 relative to the shift lever 72. This ultimately allows the extension 82 to be movable to a position abutting the engagement wall 50 when in the first mode 46. To allow the shift lever 72 to move into the second mode 48 after the shift lever 72 abuts the first engagement surface 100 and the blocker 98 abuts the protrusion 52, the extension 82 must move into the released position. The extension 82 slides along the first engagement surface 100 toward the engagement wall 50, as shown in FIG. 7, in order to allow the extension 82 to move to the position abutting the engagement wall 50.

Once the extension 82 is disengaged from the first engagement surface 100, as shown in FIG. 8, the retaining member 106 resiliently bends toward the second pin 62. Specifically, the first elbow 108 resiliently bends about the first pin 58 such that the first arm 110 rotates about the first pin 58 toward the second pin 62, causing the blocker 98 to move in a direction opposite to the first direction. The first arm 110 continues to move about the first pin 58, causing the blocker 98 to move in the direction opposite the first direction, until the first arm 110 engages with the second pin 62. The second pin 62 limits the bending of the retaining member 106 relative to the housing 22 in the direction opposite the first direction. As the extension 82 moves to the position adjacent the engagement wall 50, the second engagement surface 102 of the blocker 98 faces the extension 82 of the shift lever 72 when the shift lever 72 is adjacent the engagement wall 50.

During the second mode of operation of the shift lever 72, the shift lever 72 does not engage the blocker 98 when moving toward the second mode 48. In other words, the shift lever 72 moves to a position adjacent the engagement wall 50 such that the second engagement surface 102 of the blocker 98 faces the extension 82 of the shift lever 72, as shown in FIG. 8. The shift lever 72 may move toward the second mode 48 with the extension 82 engaging with the index track 38 until the extension 82 abuts the engagement wall 50. The shift lever 72 may move toward the second mode 48 with the extension 82 in the fully depressed position and, prior to abutting the first engagement surface 100, move to the released position such that the extension 82 abuts the engagement wall 50, therefore avoiding contact with the blocker 98. The engagement wall 50 retards movement of the shift lever 72 into the second mode 48 such that the shift lever 72 is not able to obtain enough leverage to continue to the second mode 48.

In order to move the shift lever 72 from the first mode 46 to the second mode 48, as shown in FIGS. 8-12, the blocker 98 moves in the second direction. In other words, the second engagement surface 102 is engaged by the shift lever 72 when the shift lever 72 moves from the first mode 46 to the second mode 48 with the blocker 98 moving in the second direction transverse to the first direction when the shift lever 72 abuts the second engagement surface 102. The second direction is substantially transverse to the first direction such that the second direction and the first direction intersect at any angle.

The movement of the blocker 98 in the second direction is obtained due to the fact that the retaining member 106 is slideably coupled to the housing 22. The retaining member 106 slides along the first pin 58 as the blocker 98 moves in the second direction. Specifically, the retaining member 106 is slideable between the first pin 58 and the second pin 62 as the blocker 98 moves in the second direction.

As the blocker 98 moves in the second direction, the retaining member 106 is resiliently bendable relative to the engagement feature 64. Specifically, as the blocker 98 moves in the second direction, the second elbow 112 resiliently bends about the engagement feature 64 and the second arm 114 moves about the engagement feature 64 as the first arm 110 slides between the first pin 58 and the second pin 62. During the movement of the blocker 98 in the second direction, the third arm 116 remains rigidly fixed to the housing 22. Once the blocker 98 moves in the second direction, the shift lever 72 is able to move into the second mode 48 due to the fact that the blocker 98 is spaced from the index track 38.

To finalize the movement of the shift lever 72 into the second mode 48, the extension 82 slides along the second engagement surface 102 toward the protrusion 52. The blocker 98 may, as shown when moving from FIG. 10 to FIG. 11, move further in the second direction as the extension 82 slides along the second engagement surface 102 toward the protrusion 52. Once the shift lever 72 is moved into the second mode 48, the extension 82 moves upward toward the released position in order to abut the index track 38. Likewise, the retaining member 106 slides between the first pin 58 and the second pin 62 in a direction opposite the second direction and remains in contact with the extension 82 when the shift lever 72 is locked in the second mode 48.

As set forth above, the first half 26 and the second half 28 are coupled together. For example, as shown in FIG. 2, the first half 26 defines a plurality of holes 30 and the second half 28 has a plurality of fastening devices 32 with the plurality of fastening devices 32 protruding through the plurality of holes 30. The plurality of fastening devices 32 may be any suitable fastening device, such as, but not limited to, screws, bolts, locks, or studs. The first half 26 has a pair of bosses 34 and the second half 28 has a pair of voids 36 with the pair of bosses 34 aligning with and protruding into the pair of voids 36. It is to be appreciated that, while the first half 26 and the second half 28 are aligned using the pair of bosses 34 and the pair of voids 36, the first half 26 and the second half 28 may be fastened and aligned together in any known fashion. It is to be appreciated that the housing 22 may be constructed of one or more sides and is not limited to the first half 26 and the second half 28 as described above.

Referring to FIG. 2, the shifter assembly 20 includes a shift lock override 68 secured to the first half 26 of the housing 22. A reed sensor 70 is secured to the second half 28 of the housing 22 and is electronically coupled to the vehicle's processor (not shown).

As shown in FIG. 2, the shifter assembly 20 includes a pivot bushing 54 disposed within the interior 24 and coupled to the housing 22. Specifically, the pivot bushing 54 is coupled to the first half 26 and the second half 28 via a pair of bushings 56. It is to be appreciated that the pivot bushing 54 may be coupled to the housing 22 in any known fashion.

Specifically, the shift lever 72 defines a pivot aperture 74 with the pivot bushing 54 protruding through the pivot aperture 74 such that the shift lever 72 is moveable about the pivot bushing 54. The shift lever 72 may be pivotable about the housing 22 such that the shift lever 72 is moveable relative to the housing 22. Specifically, the shift lever 72 may be pivotable about the pivot bushing 54 such that the shift lever 72 is moveable relative to the housing 22. The shift lever 72 may be coupled to the housing 22 in any manner to allow the shift lever 72.

As shown in FIG. 2, the shifter assembly 20 includes an electric connector 86 secured to the shaft 76 via a bracket 88. The shifter assembly 20 includes a release solenoid 90 coupled to the shift lever 72 and disposed within the interior 24 of the housing 22. A park lock 92 including a park lock magnet 94 is included in the shifter assembly 20 and is coupled to the release solenoid 90. The reed sensor 70 is able to detect the positioning of the park lock magnet 94. In the event of a power failure to the vehicle, the user may engage the shift lock override 68, which, in turn, engages the park lock 92 in order to allow the user to pivot the shift lever 72 out of the P position. In other words, the user may manually engage the shift lock override 68 in any suitable manner such that the shift lock override 68 engages the park lock 92, which, in turn, moves the park lock 92 into a release position that allows the shift lever 72 to move about the pivot bushing 54 out of the P position.

As best shown in FIG. 2, the shifter assembly 20 includes a shift track 44 disposed in the interior 24 of the housing 22 with the shift track 44 being fixed to the first half 26. The shift track 44 may be fixed to the housing 22 in any known fashion. It is to be appreciated that the shifter assembly 20 may include the index track 38 and/or the shift track 44 and/or any other suitable number of index tracks 38 and shift tracks 44.

With reference to FIGS. 2-12, the shift lever 72 has a plunger 96 extending outwardly from the shift lever 72 at an angle from about 15 to 90 degrees relative to the length of the shaft 76. The plunger 96 is biased toward and engages with the shift track 44 as the shift lever 72 moves between the first mode 46 and the second mode 48, which selects one of the plurality of gears.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shifter assembly for selecting one of a plurality of gears of a transmission of a vehicle, said shifter assembly comprising:
    a housing having an index track defining a plurality of positions, a first mode having at least a park position, and a second mode having at least one other position, with said index track having a length defined by said plurality of positions;
    a shift lever movably coupled to said housing with said shift lever interfacing with said index track along said length as said shift lever moves between said positions and said first and second modes;
    a blocker coupled to said housing with said blocker having a first engagement surface engageable by said shift lever when in a position of said first mode to prevent said shift lever from entering said second mode with said blocker moving in a first direction relative to said housing and said index track when said shift lever abuts said first engagement surface, and said blocker having a second engagement surface engaged by said shift lever when moving from a position of said first mode to a position of said second mode with said blocker moving in a second direction relative to said housing transverse to said first direction when said shift lever abuts said second engagement surface;
    when said shift lever is in at least said park position, said blocker is spaced from said shift lever and furthermore said blocker is spaced along said length of said index track from said shift lever.

2. A shifter assembly as set forth in claim 1 further including a retaining member engaged with said housing and wherein said blocker is further defined as a head coupled to said retaining member with said head presenting said first and second engagement surfaces and moving in said first and second directions.

3. A shifter assembly as set forth in claim 2 wherein said retaining member is rotatably and slideably coupled to said housing.

4. A shifter assembly as set forth in claim 2 further comprising a pin fixed to said housing with said retaining member being resiliently bendable about said pin as said head moves in said first direction.

5. A shifter assembly as set forth in claim 2 wherein portions of said retaining member are configured to resiliently bend relative to said housing as said head moves in both said first and second directions.

6. A shifter assembly as set forth in claim 1 wherein said index track presents an engagement wall and wherein said shift lever includes an extension that is movable to a position abutting said engagement wall when in said first mode to selectively retard movement of said shift lever into said second mode.

7. A shifter assembly as set forth in claim 6 wherein said index track presents a protrusion and wherein said extension of said shift lever abuts said blocker and moves said blocker in said first direction until said blocker abuts said protrusion.

8. A shifter assembly as set forth in claim 7 wherein said blocker has a third engagement surface spaced from said first engagement surface with said third engagement surface and said protrusion being configured to prevent rotation of said blocker relative to said shift lever.

9. A shifter assembly as set forth in claim 7 wherein said first engagement surface of said blocker aligns with said engagement wall of said index track when said blocker abuts said protrusion for aligning said extension with said position abutting said engagement wall.

10. A shifter assembly as set forth in claim 6 wherein said second engagement surface of said blocker faces said extension of said shift lever when said shift lever is adjacent said engagement wall.

11. A shifter assembly as set forth in claim 1 wherein said blocker moves along a substantially arcuate path relative to said housing and said index track when moving in said first direction.

12. A shifter assembly as set forth in claim 1 wherein said blocker moves along a linear path relative to said first direction when moving in said second direction.

13. A shifter assembly as set forth in claim 1 wherein said housing includes a first half and a second half and wherein said blocker is further defined as a first blocker coupled to said first half, and further including a second blocker spaced from said first blocker coupled to said second half.

14. A shifter assembly as set forth in claim 13 wherein said shift lever includes a shaft and an extension extending outwardly in opposite directions relative to said shaft for simultaneously engaging said first and second blockers during selective movement of said shift lever.

15. A shifter assembly as set forth in claim 1 wherein said shift lever is movable between said first and second modes along a substantially linear path with said shift lever engaging said blocker as said shift lever moves from said first mode toward said second mode along said substantially linear path.

16. A shifter assembly as set forth in claim 1 wherein said first direction is along said length of said index track.

17. A shifter assembly for selecting one of a plurality of gears of a transmission of a vehicle, said shifter assembly comprising:
    a housing having an index track defining a first mode and a second mode with at least one of said modes defining a plurality of positions and said index track having a length defined by said positions;
    a shift lever movably coupled to said housing with said shift lever interfacing with said index track along said length as said shift lever moves between said modes and said positions;
    a blocker coupled to said housing and spaced from said shift lever when said shift lever is in at least one of said positions and furthermore said blocker is spaced along said length of said index track when said shift lever is in at least one of said positions with said blocker having a first engagement surface engageable by said shift lever when in a position of said first mode to prevent said shift lever from entering said second mode with said blocker moving in a first direction relative to said housing and said index track when said shift lever abuts said first engagement surface, and said blocker having a second engagement surface engaged by said shift lever when moving from said first mode to said second mode with said blocker moving in a second direction relative to said housing transverse to said first direction when said shift lever abuts said second engagement surface;

wherein said second engagement surface is oriented transverse to said first engagement surface to facilitate said transverse movement between said first and second directions.

18. A shifter assembly as set forth in claim 17 further including a retaining member engaged with said housing and wherein said blocker is further defined as a head coupled to said retaining member with said head presenting said first and second engagement surfaces and moving in said first and second directions.

19. A shifter assembly as set forth in claim 18 wherein said retaining member is rotatably and slideably coupled to said housing.

20. A shifter assembly as set forth in claim 19 further comprising a pin fixed to said housing with said retaining member being rotatable about said pin as said head moves in said first direction.

21. A shifter assembly as set forth in claim 20 wherein said pin is further defined as a first pin and said housing includes a second pin spaced from said first pin with said retaining member being slideable between said first pin and said second pin relative to said housing as said head moves in said second direction.

22. A shifter assembly as set forth in claim 18 further comprising a pin fixed to said housing with said retaining member being resiliently bendable about said pin as said head moves in said first direction.

23. A shifter assembly as set forth in claim 22 wherein said pin is further defined as a first pin and further comprising a second pin fixed to said housing spaced from said first pin and disposed between said first pin and said head for limiting said bending of said retaining member relative to said housing in a direction opposite said first direction.

24. A shifter assembly as set forth in claim 23 wherein said retaining member is slideable between said pin and said second pin when said head moves in said second direction.

25. A shifter assembly as set forth in claim 18 wherein portions of said retaining member are configured to resiliently bend relative to said housing as said head moves in both said first and second directions.

26. A shifter assembly as set forth in claim 22 wherein said retaining member includes an elbow extending about said pin and an arm extending from said elbow to said head with said elbow being resiliently bendable relative to said pin and said arm rotating about said pin as said head moves in said first direction.

27. A shifter assembly as set forth in claim 26 wherein said elbow is further defined as a first elbow and wherein said arm is further defined as a first arm and said retaining member including a second elbow spaced from said first elbow and a second arm extending from said first elbow to said second elbow.

28. A shifter assembly as set forth in claim 27 wherein said retaining member further includes a third arm extending from said second elbow with said third arm being fixed to said housing as said head moves in both said first and second directions.

29. A shifter assembly as set forth in claim 17 wherein said blocker moves along a substantially arcuate path relative to said housing and said index track when moving in said first direction.

30. A shifter assembly as set forth in claim 17 wherein said blocker moves along a linear path relative to said first direction when moving in said second direction.

31. A shifter assembly as set forth in claim 17 wherein said shift lever is movable between said first and second modes along a substantially linear path with said shift lever engaging said blocker as said shift lever moves from said first mode toward said second mode along said substantially linear path.

32. A shifter assembly as set forth in claim 17 wherein said first direction is along said length of said index track.

33. A shifter assembly as set forth in claim 17 wherein said first mode defines said plurality of positions and said first direction is along said length of said index track between said positions.

* * * * *